United States Patent
Morley

(10) Patent No.: US 9,436,813 B2
(45) Date of Patent: Sep. 6, 2016

(54) MULTI-TENANCY SUPPORT FOR A PRODUCT THAT DOES NOT SUPPORT MULTI-TENANCY

(71) Applicant: CA, INC., Islandia, NY (US)

(72) Inventor: Shaune Patrick Morley, Raleigh, NC (US)

(73) Assignee: CA, Inc., New York, NY (US)

( * ) Notice: Subject to any disclaimer, the term of this patent is extended or adjusted under 35 U.S.C. 154(b) by 200 days.

(21) Appl. No.: 14/171,250

(22) Filed: Feb. 3, 2014

(65) Prior Publication Data

US 2015/0222638 A1    Aug. 6, 2015

(51) Int. Cl.
*G06F 21/00*    (2013.01)
*G06F 21/10*    (2013.01)

(52) U.S. Cl.
CPC .................... *G06F 21/105* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,261,295 B1* | 9/2012 | Risbood | .................... | G06F 8/61 717/177 |
| 8,769,704 B2* | 7/2014 | Peddada | ............... | H04L 63/102 705/59 |
| 8,904,549 B2* | 12/2014 | Mogaki | .................... | G06F 21/62 707/703 |
| 2012/0066755 A1* | 3/2012 | Peddada | ............... | H04L 63/102 726/8 |
| 2012/0250682 A1* | 10/2012 | Vincent | ............... | H04L 12/4633 370/390 |
| 2012/0250686 A1* | 10/2012 | Vincent | ............... | H04L 12/4633 370/392 |
| 2013/0066770 A1 | 3/2013 | Das | | |
| 2013/0073806 A1* | 3/2013 | Xavier | ............... | G06F 11/3485 711/114 |
| 2013/0074091 A1* | 3/2013 | Xavier | .................. | G06F 9/5011 718/104 |
| 2013/0276142 A1* | 10/2013 | Peddada | ............. | G06F 21/6218 726/28 |

OTHER PUBLICATIONS

Secure Logical Isolation for Multi-tenancy in Cloud Storage|http://ieeexplore.ieee.org/stamp/stamp.jsp?tp=&arnumber=6558424|2013|Factor et al.|pp. 1-5.*
Wikipedia—the free encyclopedia, "Representational State Transfer", downloaded Nov. 26, 2013 from http://en.wikipedia.org/wiki/Representational_state_transfer.com , 9 pp.

* cited by examiner

*Primary Examiner* — Mahfuzur Rahman
(74) *Attorney, Agent, or Firm* — Myers Bigel & Sibley, P.A.

(57) ABSTRACT

Enterprise software is computer software used to satisfy the needs of an organization and/or multiple individual users. Methods, systems and/or computer program product are described for providing, to a plurality of tenants, access to an enterprise software that is accessible by only a single tenant. At least one of the tenants accessing the enterprise software includes a plurality of users.

9 Claims, 16 Drawing Sheets

MULTI-TENANCY SUPPORT FOR A PRODUCT THAT DOES NOT SUPPORT MULTI-TENANCY

BACKGROUND

Various embodiments described herein relate to computer systems, methods and program products, and more particularly to enterprise systems, methods and computer program products.

Enterprise software, also known as an enterprise software application or as an enterprise level software, is computer software used to satisfy the needs of an organization and/or multiple individual users. Such organizations can include businesses, schools, interest-based user groups, retailers, and/or governments. Enterprise software may be an integral part of a computer based information system of an organization.

Services provided by enterprise software are typically business-oriented tools such as online shopping and online payment processing, interactive product catalogs, automated billing systems, security, enterprise content management, IT service management, customer relationship management, enterprise resource planning, business intelligence, project management, collaboration, human resource management, manufacturing, enterprise application integration, and/or enterprise forms automation.

Presently, due to the cost of building or buying specialized enterprise software, only large enterprises may have the resources to deploy enterprise software. However, smaller organizations or individual users may desire to use enterprise software. Managed Service Providers (MSPs) may want to provide cost-effective solutions including access to enterprise software to these smaller organizations or individual users.

BRIEF SUMMARY

Various embodiments described herein provide access to enterprise software that supports multiple users. Specifically, some embodiments described herein provide a plurality of tenants access to an enterprise software that is accessible by only a single tenant. At least one of the tenants supports a plurality of users.

Various embodiments described herein also can provide to the plurality of tenants access to the enterprise software by constructing a wrapper around the enterprise software. Some embodiments provide a Managed Service Provider (MSP) access to the wrapper to provide the plurality of tenants with access to the enterprise software.

Some embodiments may also provide access to the enterprise software by receiving a request for a tenant to use the enterprise software. Some embodiments may determine if the enterprise software has capacity to support the tenant. Access to the enterprise software is provided to the tenant in response to determining that the enterprise software has the capacity to support the tenant.

In some embodiments, determining if the enterprise software has capacity to support the tenant may include determining, based on the request received for the tenant, that a data entity is associated with the tenant. The data resources required by the data entity that is associated with the tenant may be determined. A check may be performed to determine if the enterprise software has capacity to support the data resources required by the tenant.

Various embodiments described herein also can provide access to the enterprise software to the tenant in response to determining that the enterprise software has capacity to support the tenant by provisioning data resources related to the enterprise software to be associated with the data entity. Information related to the data entity may be stored. One or more users associated with the tenant may be authorized to access the data resources. The data entity may be added to a collection that allows the data resources to be accessed by the one or more users associated with the tenant.

In some embodiments, determining if the enterprise software has capacity to support the tenant may include determining, based on the request received for the tenant, a number of prospective users associated with the tenant. A number of provisioned users configured to access the enterprise software may be determined. Additionally, it may be determined if the enterprise software has capacity to support the number of prospective users associated with the tenant in addition to the number of provisioned users configured to access the enterprise software.

Various embodiments described herein also can provide access to the enterprise software to the tenant in response to determining that the enterprise software has capacity to support the tenant by assigning resources related to the enterprise software to the tenant. Information related to the tenant may be stored. User authorization for one or more users associated with the tenant may be performed.

Further embodiments herein may include segregating data associated with an administrative function of the enterprise software for the tenant from data associated with the administrative function of other tenants. An administrative user authorized to access the administrative function of the enterprise software may be identified. Access may be provided for the administrative user to access the administrative function of the enterprise software based on the data that was segregated.

In any of the above described embodiments, the enterprise software may be accessed by the one or more users associated with the tenant.

It will also be understood that various embodiments have been described above in connection with methods of providing multi-tenancy support for enterprise software. However, various other embodiments described herein can provide computer program product that can provide multi-tenancy support for enterprise software, according to any of the embodiments described herein.

Moreover, various other embodiments described herein can provide a software accessing system for enterprise software. The software accessing system may comprise a processor and a software application that runs on the processor and is configured to provide multi-tenancy support for the enterprise software, according to any of the embodiments described herein.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s). In the drawings.

DETAILED DESCRIPTION

As was noted above, enterprise software is computer software used to satisfy the needs of an organization and/or multiple individual users. Typically, enterprise software may be accessible by only a single customer or tenant that includes a single user or multiple individual users. Yet, heretofore, mechanisms do not appear to have been available to provide a plurality of tenants access to an enterprise software that is accessible by only a single tenant. Historically, in order to support multiple customers with an enterprise level software product, a separate version of the enterprise software would need to be hosted for each tenant or customer.

According to various embodiments described herein, access to an enterprise software accessible by only a single tenant, is provided to a plurality of tenants, where at least one of the tenants includes a plurality of users. Various embodiments described herein may layer on top of an existing enterprise level software to turn the existing enterprise software into a multi-tenant solution. In some embodiments, a wrapper may be constructed around the enterprise software. A Managed Service Provider (MSP) may be provided with access to the wrapper in order to provide a plurality of tenants with access to the enterprise software.

Figure 1:
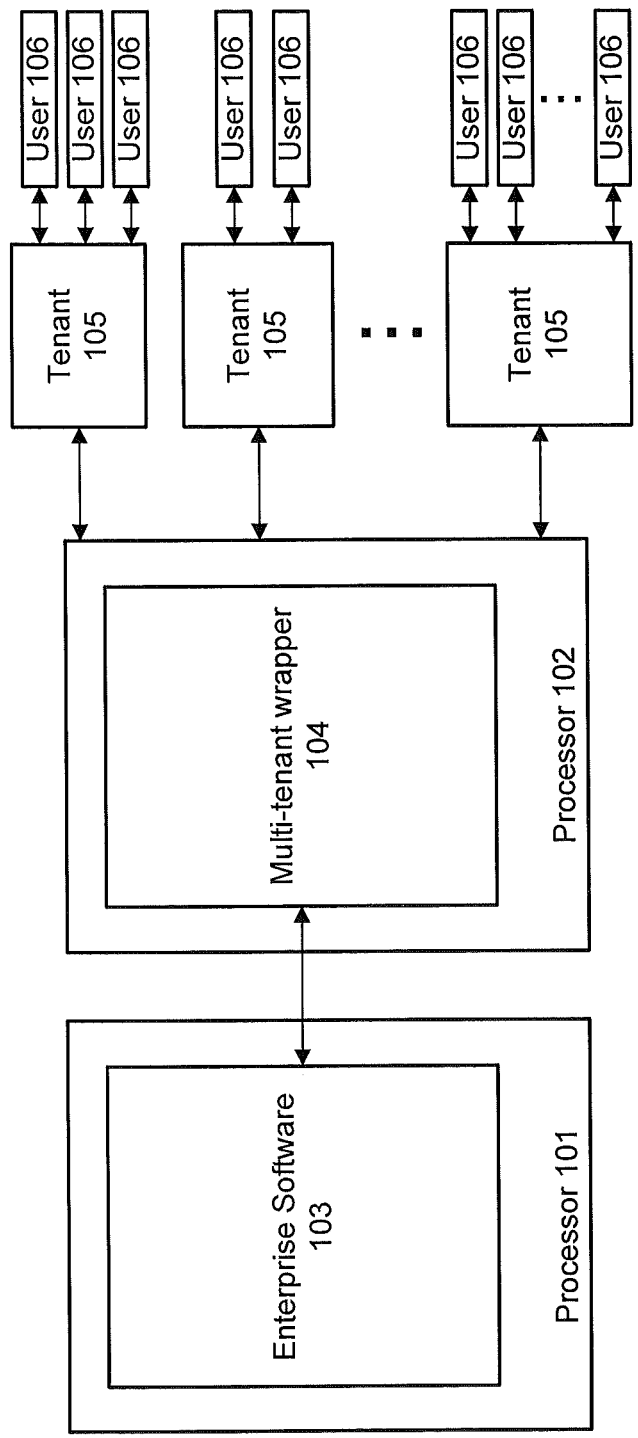
FIG. 1 is a simplified block diagram of enterprise software configured for use by multiple tenants by a system, method and/or computer program product according to various embodiments described herein.

FIG. 1 is a simplified block diagram of an enterprise software 103 configured for use by multiple tenants/customers 105 by a system, method and/or computer program product according to various embodiments described herein. As shown in FIG. 1, the enterprise software 103 may communicate with a multi-tenant wrapper 104 in order to provide multi-tenant capability. The enterprise software 103 and/or the multi-tenant wrapper 104 may run on one or more processors, 101 and/or 102, respectively, that include one or more Central Processing Units (CPUs) on which one or more operating systems and one or more applications run. One or more tenants 105 communicate with the enterprise software 103 by way of the multi-tenant wrapper 104. A tenant may be a customer or organization such as a business or school. Each tenant 105 supports one or more users 106 that need to access the enterprise software. In some embodiments, at least one of the tenants 105 includes more than one user 106. The multi-tenant wrapper 104 may be embodied by one or more enterprise, application, personal, pervasive and/or embedded computer systems that are operable to receive, transmit, process and store data using any suitable combination of software, firmware and/or hardware, and that may be standalone or interconnected by any conventional public and/or private, real and/or virtual, wired and/or wireless network including all or a portion of the global communication network known as the Internet. One or more processors 101 and/or 102 communicate with one or more memories that may be a combination of any one or more tangible computer-readable media. Processors 101 and/or 102 may be implemented as a single processor, multiple processors, or a combination of different multipurpose processors. User input/output devices 106 for a plurality of users for whom access to an enterprise software 103 application will be needed, may include output devices, such as a graphical display and/or loudspeaker, and input devices, such as a keyboard, touch screen, mouse and/or microphone. A "user input/output device" 106 may also be referred to herein simply as a "user". The processors 101 and/or 102, the memory, and the user input/output devices 106 may communicate with one another over one or more buses and/or using other computer architectures. The user input/output devices 106 may be connected to processors 101 and/or 102 directly, via a user interface and/or by any conventional public and/or private, real and/or virtual wired and/or wireless network including all or a portion of the global communication network known as the Internet.

Figure 2:
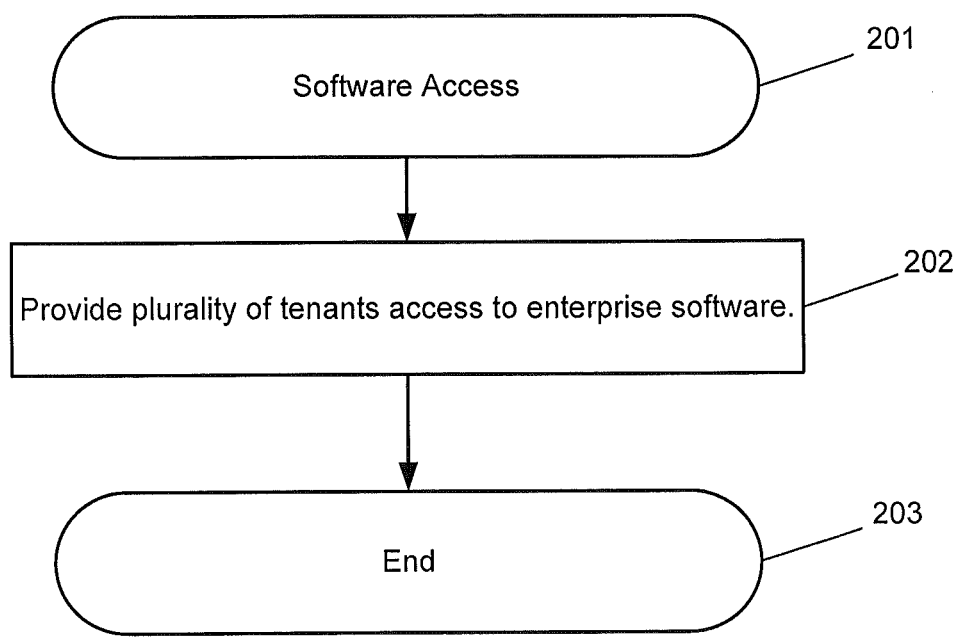
FIG. 2 is a flowchart of operations that may be performed to provide a plurality of tenants access to enterprise software according to various embodiments described herein.

FIG. 2 is a flowchart of operations that may be performed to provide a plurality of tenants access to enterprise software, according to various embodiments described herein.

Referring to FIG. 2, an enterprise software may be running at Block 201, which may be embodied, for example, as the multi-tenant wrapper 104 of FIG. 1. The enterprise software itself is designed for access by only a single tenant. A multi-tenant solution for the enterprise software accessible by only a single tenant are, in general, beyond the scope of a single enterprise-level instance of the enterprise software. However, various embodiments described herein may provide a plurality of tenants with access to the enterprise software at Block 202. At least one of the plurality of tenants may include a plurality of users.

Figure 3:
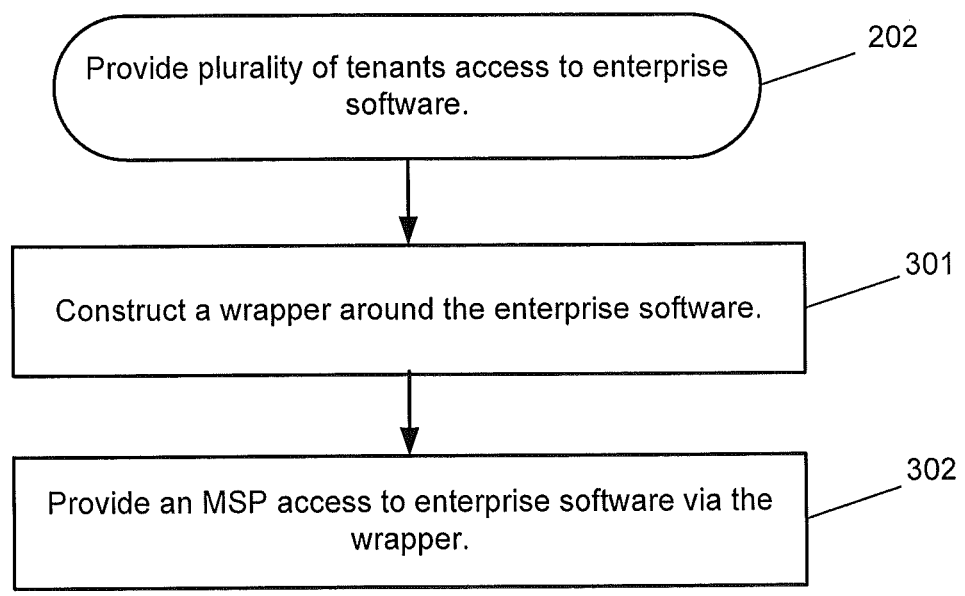
FIGS. 3-5 are flowcharts of operations that may be performed to provide a plurality of tenants access to enterprise software via a system, method and/or computer program product according to various embodiments described herein.

FIG. 3 is a flowchart of operations that may be performed to provide a plurality of tenants access to the enterprise software which may correspond to Block 202 of FIG. 2. Referring to FIG. 3, at Block 301, a wrapper may be constructed around the enterprise software. The wrapper may be a software wrapper, a hardware wrapper including a processor, or a combination of a hardware and software wrapper. The wrapper may encapsulate the enterprise software and provide interfaces to access data and/or functionality of the enterprise software. The wrapper may be helper or utility program to add, enhance, or otherwise modify existing functionality of the enterprise software. In some embodiments, the enterprise software may be unmodified with existing interfaces of the enterprise software being used by the wrapper to control the enterprise software. In some embodiments, the interfaces of the enterprise software may be modified to ensure the desired level of control of the enterprise software. At Block 302, access to the enterprise software may be provided to an Managed Service Provider (MSP) through the wrapper constructed around the enterprise software.

Figure 4:
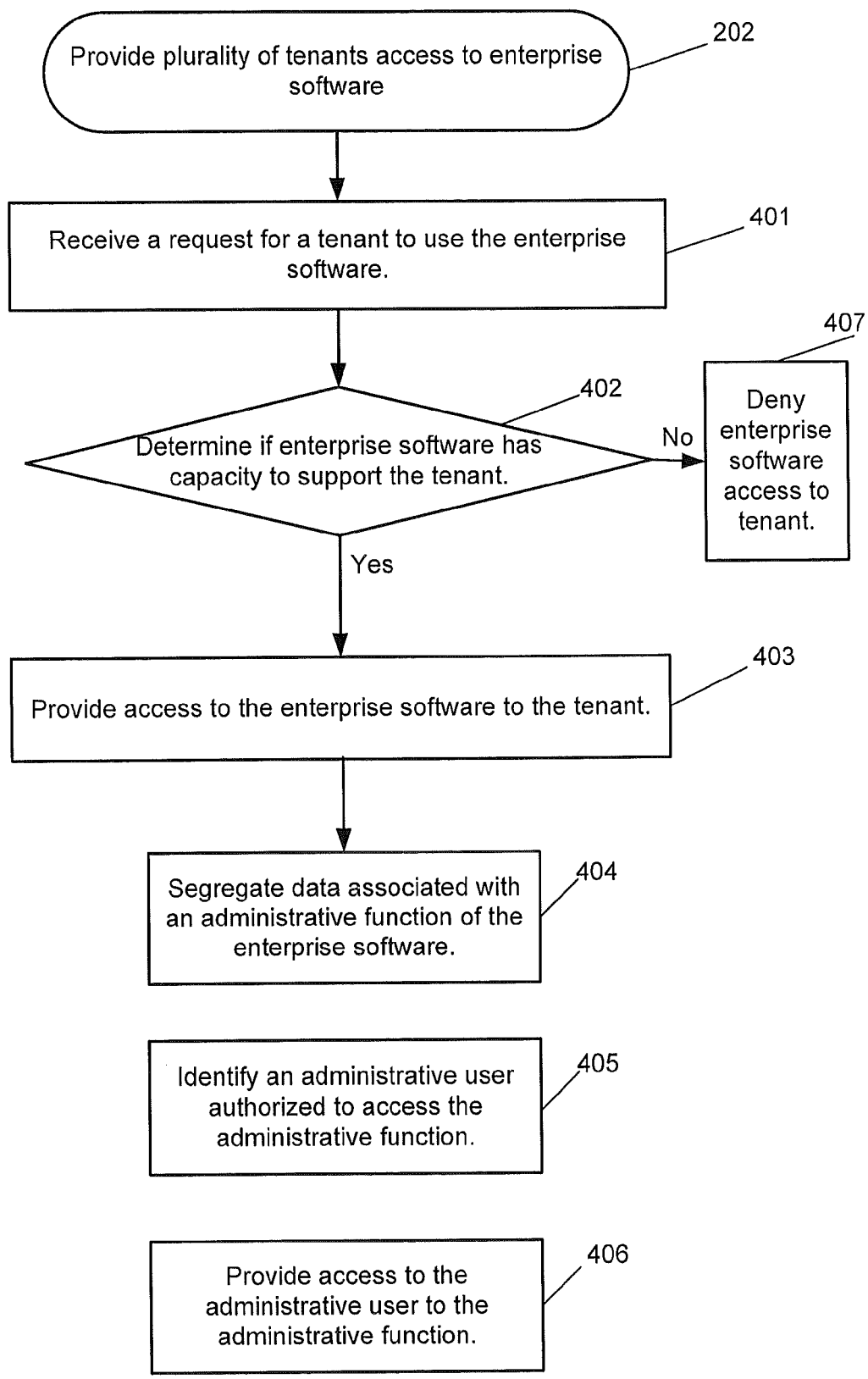

FIG. 4 is a flowchart of operations that may be performed to provide a plurality of tenants access to the enterprise software according to other embodiments described herein, which may correspond to Block 202 of FIG. 2. Referring to FIG. 4, at Block 401, a request for a tenant to use the enterprise software may be received. Then, at Block 402, a determination may be made as to whether the enterprise software has capacity to support the tenant. At Block 403, if the enterprise software has capacity to support the tenant, access to the enterprise software is provided to the tenant. If the enterprise software does not have capacity to support the tenant, at Block 407, access to the enterprise software is denied to the tenant. In some embodiments, at Block 404, data associated with an administrative function of the enterprise software may be segregated. Then, at Block 405, an administrative user authorized to access the administrative function may be identified. Access to the administrative function may be provided to the administrative user, such as at Block 406. Several administrative users associated with the same tenant or with different tenants may be identified. The data associated with each of the administrative functions associated with different tenants may be segregated such that each tenant has a different view of the administrative functions. Accordingly, operations of FIG. 4 may provide access to enterprise software if it has capacity to support the additional tenant Additionally, data segregation may be utilized to provide administrative functions to authorized users within multiple tenants.

Figure 5:
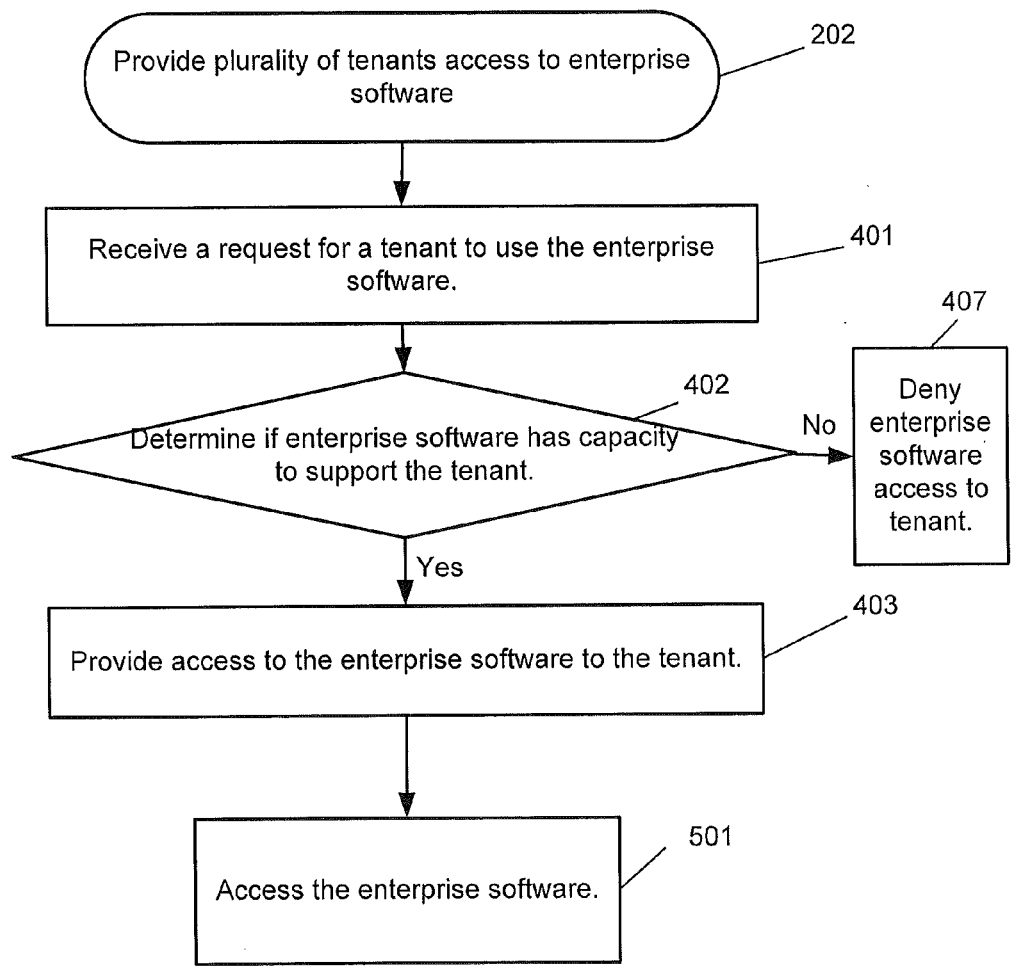

FIG. 5 is a flowchart of operations that may be performed to provide a plurality of tenants access to the enterprise software according to other embodiments described herein, which may correspond to Block 202 of FIG. 2. Referring to FIG. 5, at Block 401, a request for a tenant to use the enterprise software may be received. Then, at Block 402, a determination may be made as to whether the enterprise software has capacity to support the tenant. At Block 403, if the enterprise software has capacity to support the tenant, access to the enterprise software is provided to the tenant. If the enterprise software does not have capacity to support the tenant, at Block 407, access to the enterprise software is denied to the tenant. In some embodiments, at Block 501, the enterprise software is accessed by the tenant or by users associated with the tenant.

Figure 6:
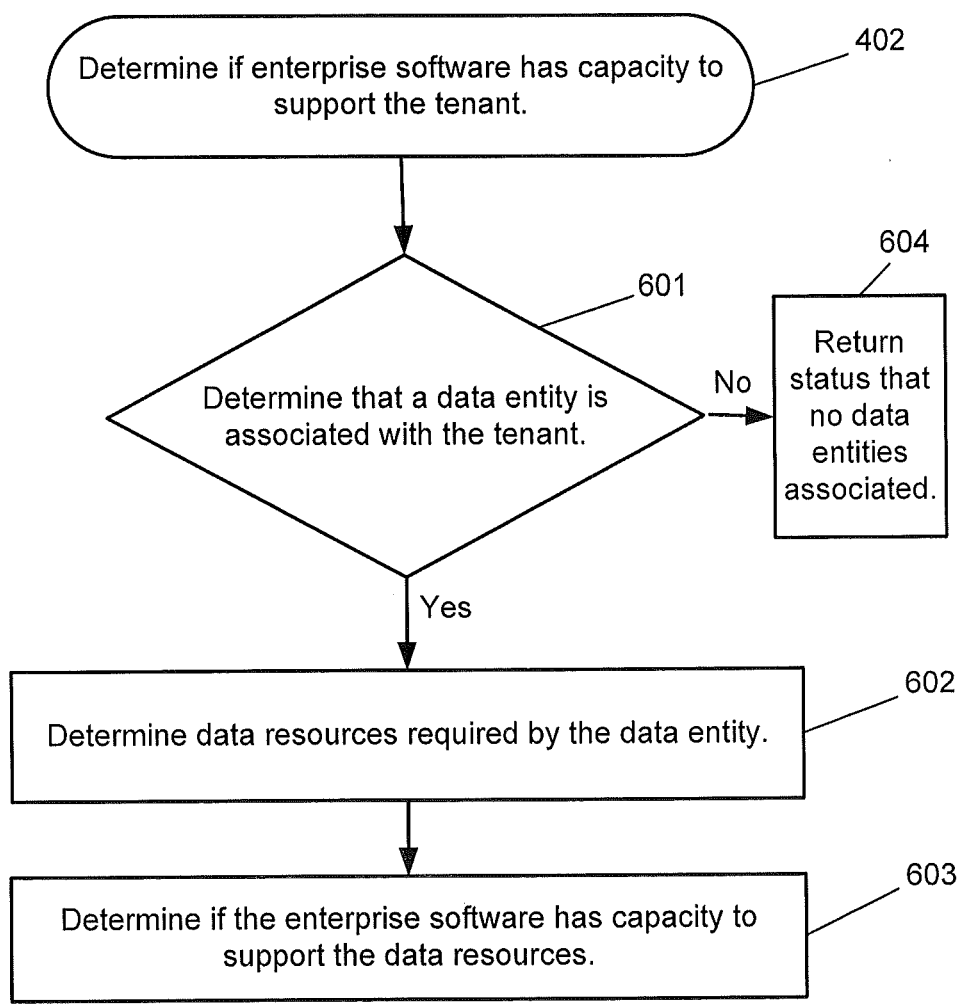
FIG. 6 is a flowchart of operations that may be performed to determine if enterprise software has capacity to support the tenant by a system, method and/or computer program product according to various embodiments described herein.

FIG. 6 is a flowchart of operations to determine if the enterprise software has capacity to support the tenant according to some embodiments described herein, which may correspond to Block 402 of FIG. 4. Referring to FIG. 6, at Block 601, it may be determined that a data entity is associated with the tenant. If it is determined that there is not a data entity associated with the tenant, at Block 604, a status is returned indicating that no data entities are associated with the tenant. Otherwise, at Block 602, if it is determined that a data entity is associated with the tenant, the data resources required by the data entity may be determined. Then, at Block 603, it may be determined if the enterprise software has capacity to support the data resources.

Figure 7:
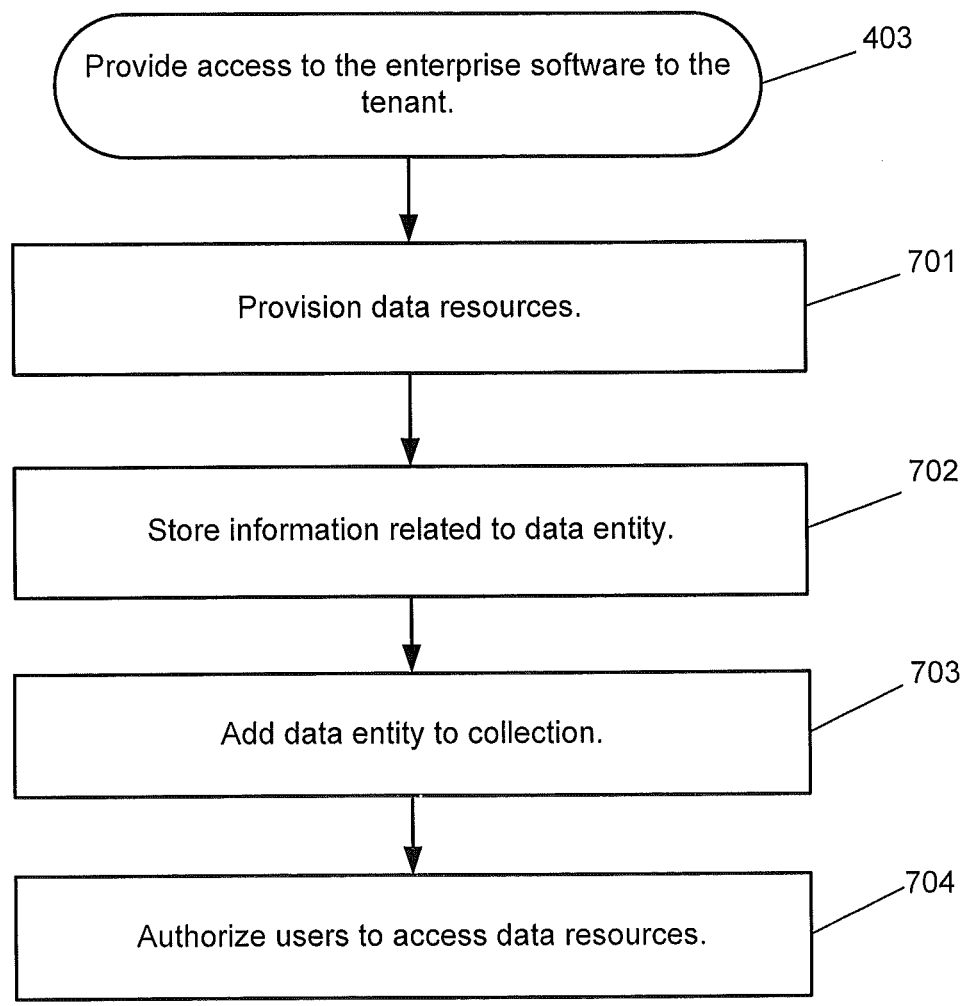
FIG. 7 is a flowchart of operations that may be performed to provide access to the enterprise software to the tenant by a system, method and/or computer program product according to various embodiments described herein.

FIG. 7 is a flowchart of operations to provide access to the enterprise software to the tenant according to some embodiments described herein, which may correspond to Block 403 of FIG. 4. Referring to FIG. 7, at Block 701, the data resources are provisioned. At Block 702, information related to the data entity is stored. At Block 703, the data entity is added to a collection. Then, at Block 704, users are authorized to access the data resources. The data for each customer or tenant is formed into collections that are then made available to users. These collections may be distinct file systems created explicitly for a particular tenant or a set of data stored in a database that is keyed to belong to a particular customer, or a complex reporting group arrangement that is created in the enterprise software explicitly for that customer. The type of collection will depend on the enterprise product. For example, a collection may include SNMP data that has been collected from network hardware that has been provisioned into the system as data entities by the customer. The data collected and stored from these data entities by the enterprise software will be stored in collections that may be used by users associated with a given customer or specifically authorized users.

Figure 8:
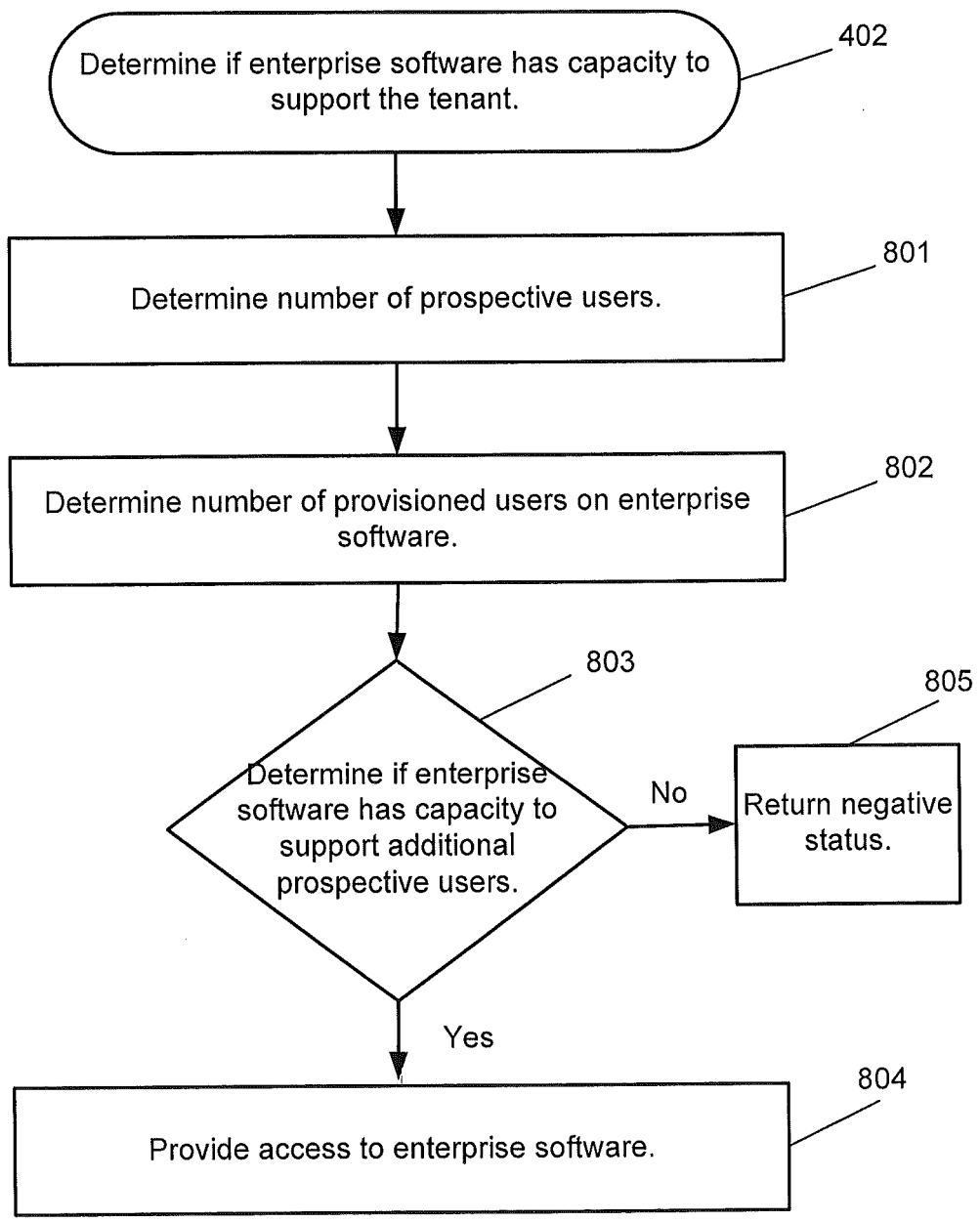
FIG. 8 is a flowchart of operations that may be performed to determine if enterprise software has capacity to support the tenant by a system, method and/or computer program product according to various embodiments described herein.

FIG. 8 is a flowchart of operations to determine if the enterprise software has capacity to support the tenant according to other embodiments described herein, which may correspond to Block 402 of FIG. 4. Referring to FIG. 8, at Block 801, a number of prospective users associated with the tenant may be determined. At Block 802, a number of provisioned users on the enterprise software may be determined. Then, at Block 803, if may be determined if the enterprise software has capacity to support additional prospective users. At Block 804, if there is enough capacity, the tenant and/or associated users are provided access to the enterprise software. Otherwise if there is not enough capacity to support additional prospective users, at Block 805, a negative status indication is provided.

Figure 9:
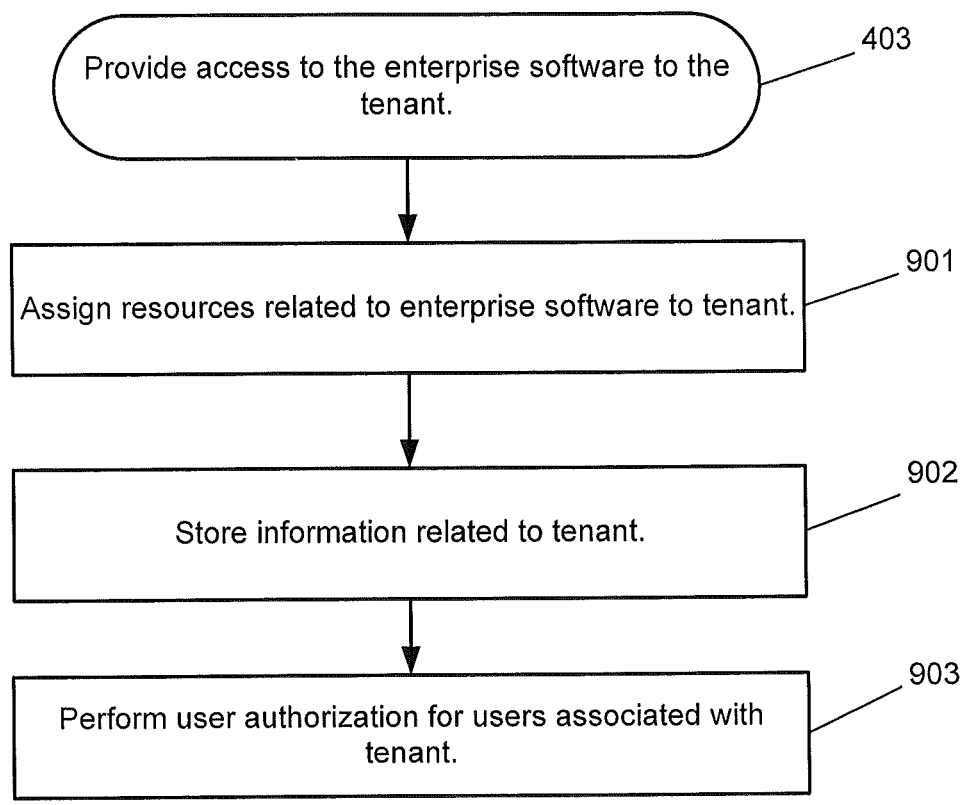
FIG. 9 is a flowchart of operations that may be performed to provide access to the enterprise software to a tenant by a system, method and/or computer program product according to various embodiments described herein.

FIG. 9 is a flowchart of operations to provide access to the enterprise software to the tenant according to other embodiments described herein, which may correspond to Block 403 of FIG. 4. Referring to FIG. 9, at Block 901, resources related to the enterprise software are assigned to the tenant. At Block 902, information related to the tenant are stored. At Block 903, user authorization is performed for users associated with the tenant. The authorized users may now be able to use the enterprise software.

Figure 10:
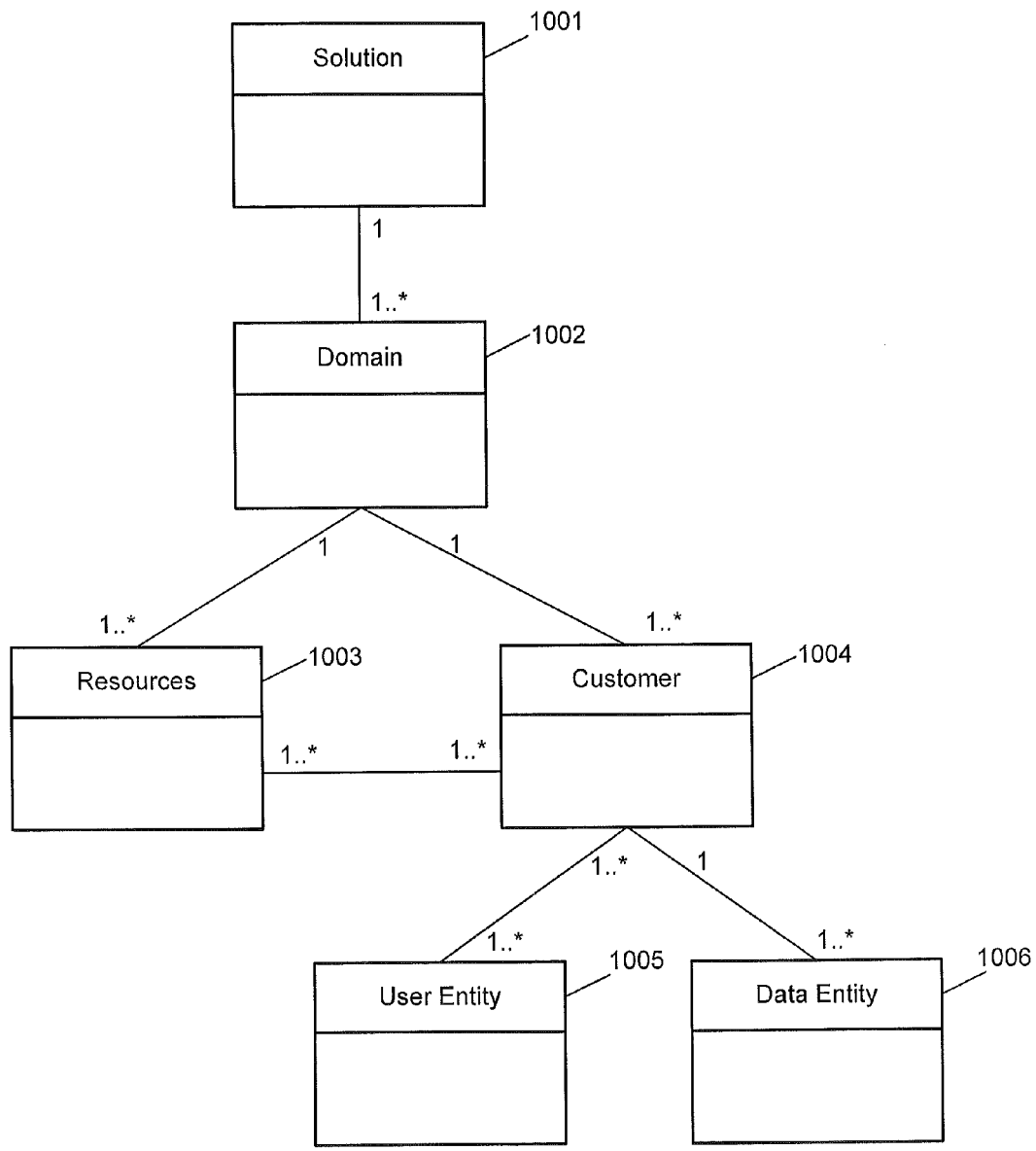
FIG. 10 is a component view of a solution to provide enterprise software access to multiple tenants by a system, method and/or computer program product according to various embodiments described herein.

FIG. 10 is a component view of a solution to provide enterprise software access to multiple tenants by a system using the multi-tenant wrapper 104 of FIG. 1. Various embodiments described herein may be referred to as a multi-tenant solution. Referring to FIG. 10, a solution component 1001 depends upon a structure of data in order to provide multi-tenancy support to an enterprise software. The solution component 1001 has a one-to-many relationship with a domain component 1002. The domain component 1002 may be a logical breakdown of resources not part of the enterprise software. Each domain component 1002 has one or more resource components 1003 and/or one or more customer components 1004. The domain component 1002 has a one-to-many relationship with the resource components 1003 and/or customer components 1004. Each customer component 1004 may have a one-to-many relationship with one or more user entities 1005 and/or one or more data entities 1006. A customer 1004 will be associated to one or more resources 1003 depending upon enterprise products that are associated with the customer. The solution component 1001 depends upon the above described structure of data to provide multi-tenant support. The solution component 1001 includes three API layers: the display layer, the application layer, and the data layer. These three layers will now be discussed in more detail in the context of a business workflow as illustrated in FIG. 11.

Figure 11:
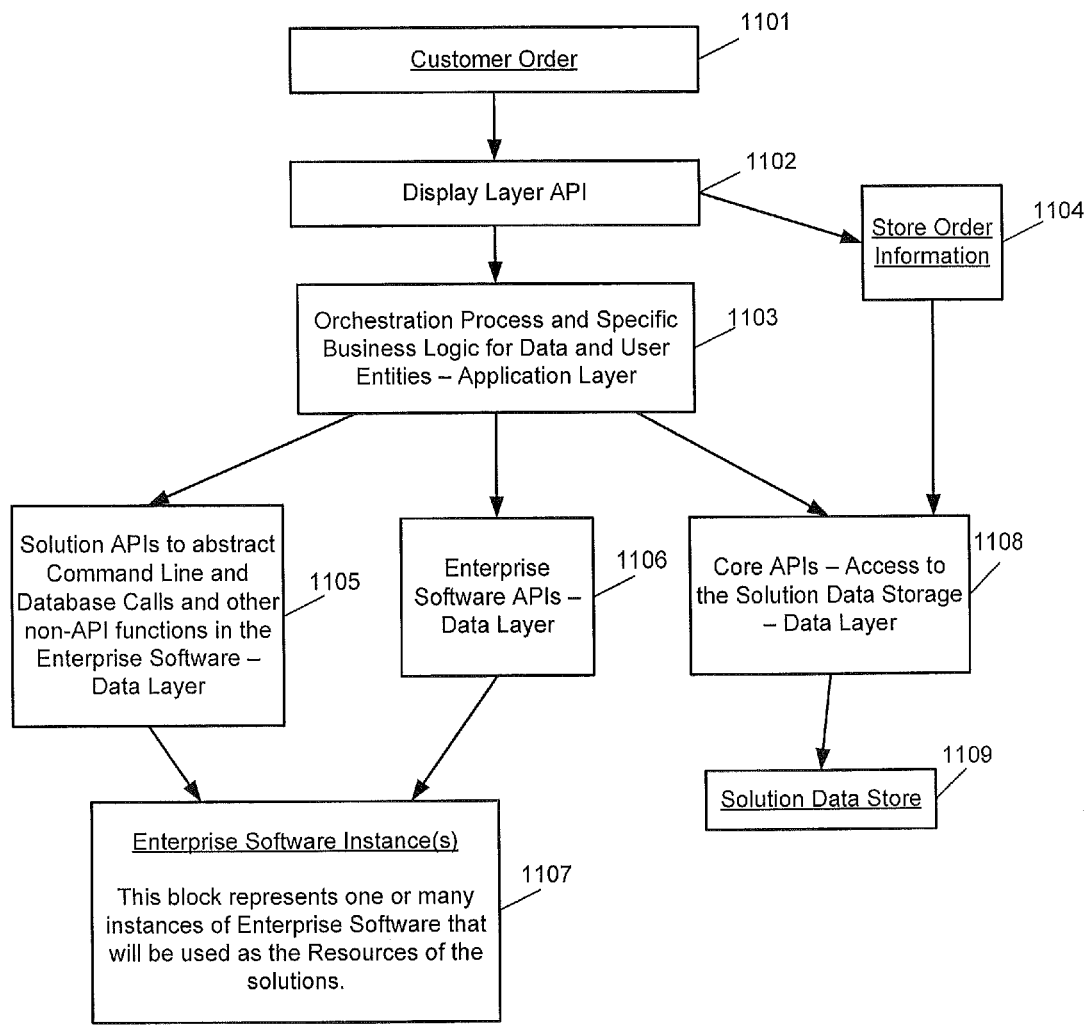
FIG. 11 is an analysis business workflow to provide enterprise software access to multiple tenants by a system, method and/or computer program product according to various embodiments described herein.

FIG. 11 is an analysis business workflow to provide enterprise software access to multiple tenants according to some embodiments, which may correspond to Block 202 of FIG. 2. Referring to FIG. 11, Block 1101 illustrates a customer order. The basic entry point into the system may be the customer order 1101. The customer order 1101 is entered into a display layer that is an input/output layer that may allow outside agencies such as MSPs to interact with the multi-tenancy solution. The display layer may be a Business Support Systems (BSS) layer. BSS is a collective term for software solutions used to support customers. The term BSS may encompass software that supports billing and charging, customer management, product design and management, sales and marketing, and order and order activation. The display layer may include a display layer API 1102 for interaction between the customer and the multi-tenancy solution. The display layer may be, for example, a combination of RESTful API's and Java Web Services that accept, validate and then start the processing or retrieval activities necessary to complete the request. The display layer may store order information at Block 1104. The display layer 1102 may interact with an application layer 1103 by requesting an orchestration process based on the type of order being processed, such as add, modify, delete, or a "get" request for information, or requesting resources effected by the request. The orchestration process may take each order, break it down to smaller pieces, and process each piece through business logic that is custom for each enterprise software product. While an order may contain more than one data or user entities, these entities may be processed one at a time through the Business Logic. Each data or user entity may be treated as an individual component and can contain information unique to it.

The orchestration process may also act as a controller to ensure that the order is handled successfully. If an error occurs during processing, reasons for the error are identified such that the orchestration process acts as a link for a delivery team to troubleshoot a failed order. After resolution of errors, a restart of the orchestration process may follow to allow the order to proceed. The application layer 1103 includes business logic for data and user entities since the application layer 1103 may analyze the order and direct activities to the correct RESTful APIs or Java Services necessary to complete the order.

Further referencing FIG. 11, the data layer may include enterprise software APIs 1106, solution APIs 1105, and a core APIs 1108. The enterprise software APIs 1106 may include a combination of RESTful APIs and SOAP APIs available through the enterprise software products. The solution APIs 1105 may include APIs to abstract command line and database calls and other non-API functions in the enterprise software. For example, these solution APIs 1105 may include RESTful APIs and Java Services created for the solution to abstract the data interaction for those enterprise software products that do not have sufficient APIs available to support the solution. Core APIs 1108 may include access to a solution data storage 1109 in order to store information. Access to data may abstracted through combinations of enterprise APIs 1106, solution APIs 1105, and core APIs 1108 to aide in driving consistency and the accuracy of the solution. Block 1107 includes one or more instances of the enterprise software. The enterprise software may be used as a resource of the multi-tenancy solution.

Figure 12:
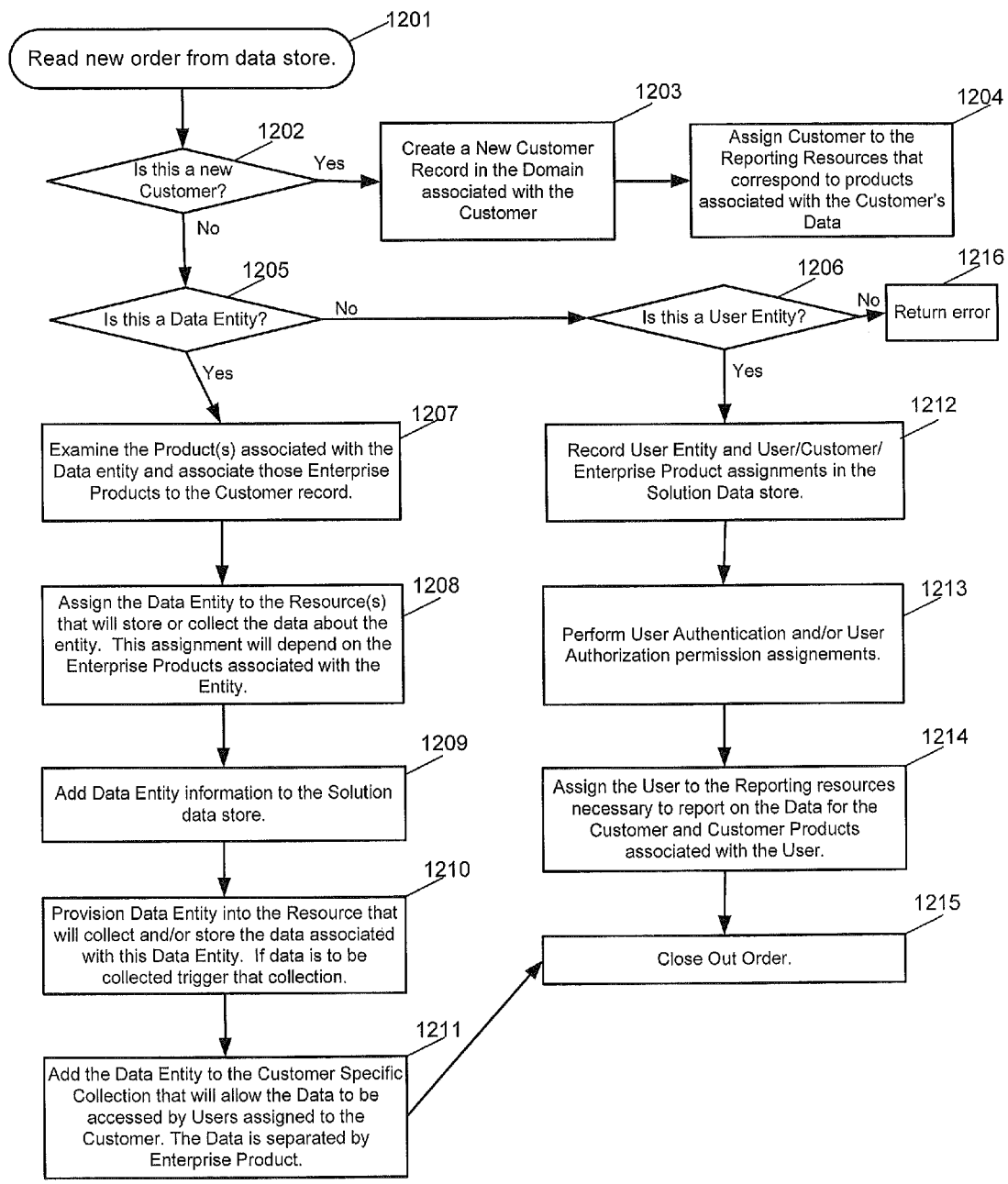
FIG. 12 is a data flow model for a customer in order to provide enterprise software access to multiple tenants by a system, method and/or computer program product according to various embodiments described herein.

FIG. 12 is a data flow model for a customer in order to provide enterprise software access to multiple tenants according to some embodiments described herein which may correspond to a data entity of FIG. 6 and a user entity of FIG. 8. Referring to FIG. 12, a new order may be read from a data store at Block 1201. At Block 1202, the order may be evaluated to determine if it is a new customer. If it is a new customer, a new customer record may be created at Block 1203. The new customer record may be created in a domain associated with the customer/tenant. The customer may be assigned to reporting resources that correspond to products associated with the customer's data, as in Block 1204. If the order is evaluated to not be a new customer at Block 1202, then it is determined at Block 1205 whether it is a data entity. If the order includes a data entity, flow proceeds to Block 1207. Otherwise, the order will be evaluated if it is a user entity at Block 1206. If the order includes a user entity, flow proceeds to Block 1212. If the order is not a user entity, at Block 1216, an error is returned.

Further referencing FIG. 12, if the order is determined to be for a data entity at Block 1205, enterprise software products associated with data entity are examined at Block 1207. The enterprise software products are associated to the customer record. Then, at Block 1208, the data entity is assigned to one or more resources that will store or collect data about the entity. This assignment will depend upon the enterprise software products associated with the data entity. Moreover, at Block 1209, the data entity information is added to the solution data store. Then, at Block 1210, the data entity is provisioned into the one or more resources that will collect and/or store the data associated with the data entity. If necessary, the collection of data may also be triggered at this point. At Block 1211, the data entity is added to a customer specific collection that will allow the data to be accessed by the users assigned to the customer. Only a subset of users of the customer/tenant may be authorized to access the collected data. This data may be separated by enterprise software product or aggregated as desired by the customer. Then, at Block 1215, the order may be closed out such that the enterprise software may operate in a normal running mode.

Further referencing FIG. 12, the order will be evaluated if it is a user entity at Block 1206. If the order includes a user entity, flow proceeds to Block 1212 where the user entity and user, customer, and enterprise software product assignments are recorded in the solution data store 1109. Then, at Block 1213, user authentication and/or user authorization permission assignments are performed. Moreover, at Block 1214, the user is assigned to the reporting resources necessary to report on the data for the customer and enterprise software products associated with the user. Then, at Block 1215, the order may be closed out such that the enterprise software may operate in a normal running mode.

Figure 13:
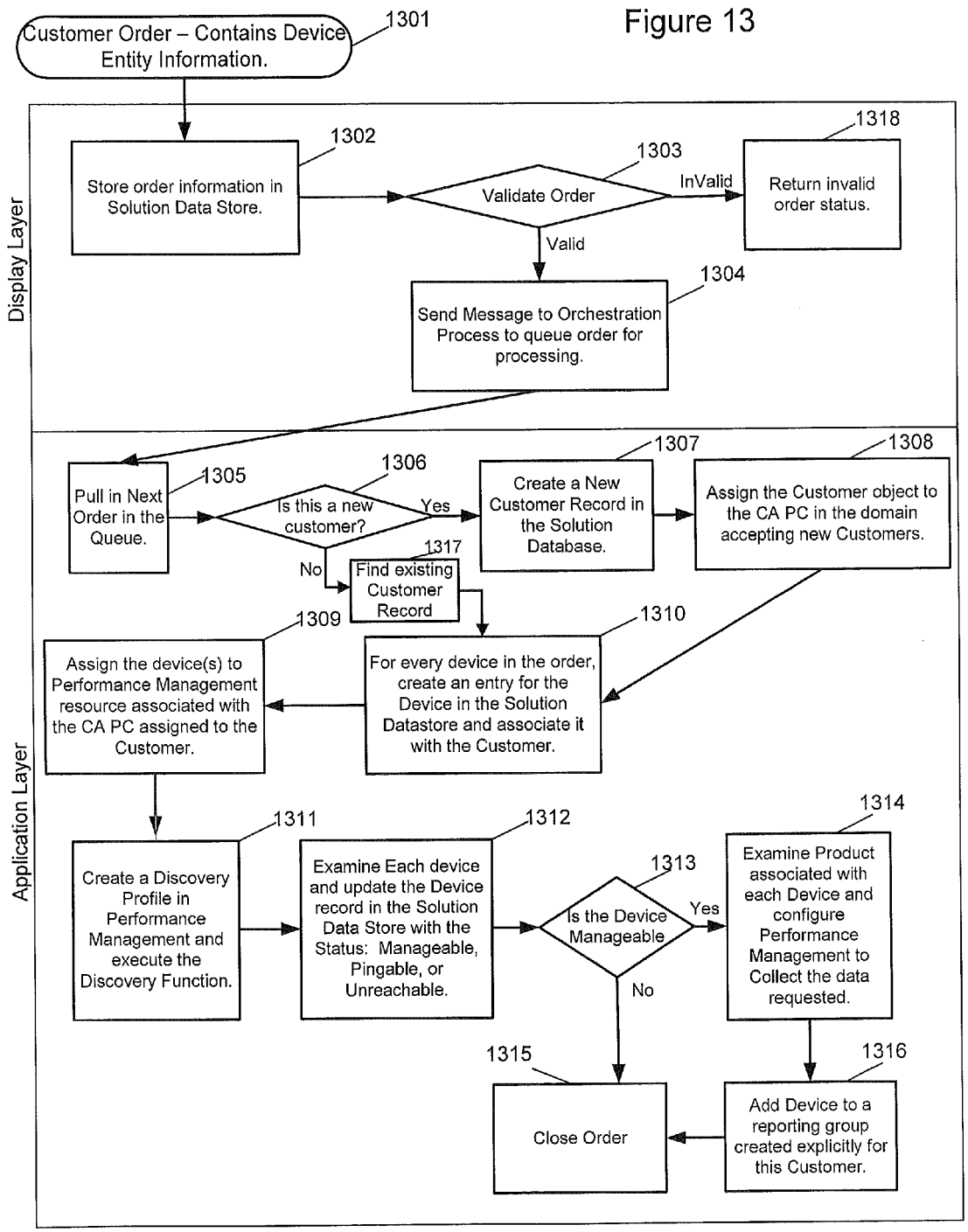
FIG. 13 is a data flow model of a data entity to provide enterprise software access to multiple tenants by a system, method and/or computer program product according to various embodiments described herein.

FIG. 13 is a data flow model of a data entity to provide enterprise software access to multiple tenants according to some embodiments, which may correspond to Block 401 of FIG. 4. Flow may begin at Block 1301 with a customer order containing device entity information. A device may be a router, switch, server, or a specialized version of one of these types. A device may be a distinct entity that has its own distinct data that will be collected and reported on. A device may also be virtual, such as a VMware instance. In other words, the device may be a distinct entity that contains its own data, and may be real or virtual. The customer order enters the display layer where, at Block 1302, the order information is stored in the solution data store. The order is validated at Block 1303. If the order is invalid, at Block 1318, an invalid order status is returned. If this order is determined to be valid, flow proceeds to Block 1304 where a message may be sent to the orchestration process to queue the order for processing. Flow may then proceed to the application layer which, at Block 1305 pulls in the next order in the processing queue. Then, at Block 1306, it may be determined if this customer order is for a new customer. If it is determined that this order is for a new customer, a new customer record may be created in a solution database, at Block 1307. Then, a customer object may be assigned to a performance center (PC), such as a CA Technologies PC (CA PC), in a domain accepting new customers. If it is determined at Block 1306 that this is not a new customer, then, at Block 1317, an existing customer record is found and assigned. Moreover, at Block 1310, for every device in the order, an entry may be created for the device in the solution data store, with the entry being associated with the customer. At Block 1309, the device is assigned to a performance management resource associated with the performance center assigned to the customer. Then, at Block 1311, a discovery profile may be created in the performance management resource. Each device may be examined, at Block 1312, to update the device record in the solution data store with a status. The status may be, for example, manageable device, pingable device, or unreachable device. Then, at Block 1313, it is determined for each device if the device is manageable. If the device is not manageable, the order is closed at Block 1315. If the device is manageable, at Block 1314, the enterprise software product associated with each device is examined and configured such that the performance management resource collects requested data from the device. Then, at Block 1316, the device is added to a reporting group created for the customer. The order may then be closed at Block 1315. The application and display layer of FIG. 13 both interact with the solution storage and enterprise software through the data layer. The data layer may be viewed as an abstraction layer created to centralize the access to the various resources that will store and report on data. Although not explicitly shown in FIG. 13, access to the data layer in implied in various flow chart actions that have been described above.

Figure 14:
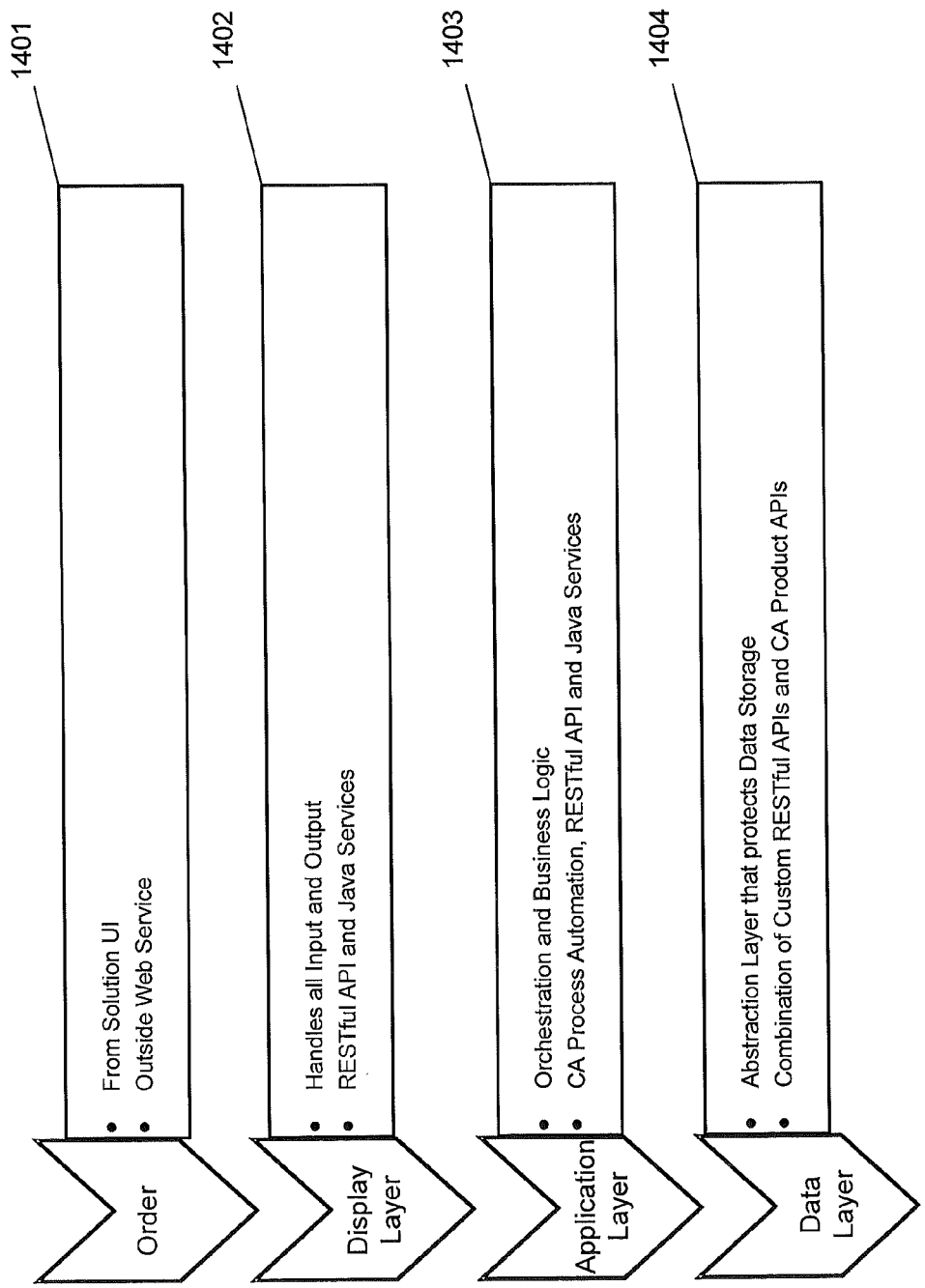
FIG. 14 is a solution work flow to provide enterprise software access to multiple tenants by a system, method and/or computer program product according to various embodiments described herein.

FIG. 14 is a solution work flow to provide enterprise software access to multiple tenants according to some embodiments, which may correspond to operations performed by the multi-tenant wrapper 104 of FIG. 1. An order may arrive at Block 1401 from a solution UI or from outside web services. At Block 1402, the display layer may handle inputs and outputs. For example, the display layer may be capable of handling RESTful APIs and Java services. At Block 1403, the application layer may perform orchestration and provide business logic specific to the enterprise software. The application layer may also perform process automation as well as handle RESTful APIs and Java services. At Block 1404, the data layer may include an abstraction layer that protect data in the data storage. This data layer may include a combination of custom RESTful APIs and enterprise software APIs.

Figure 15:
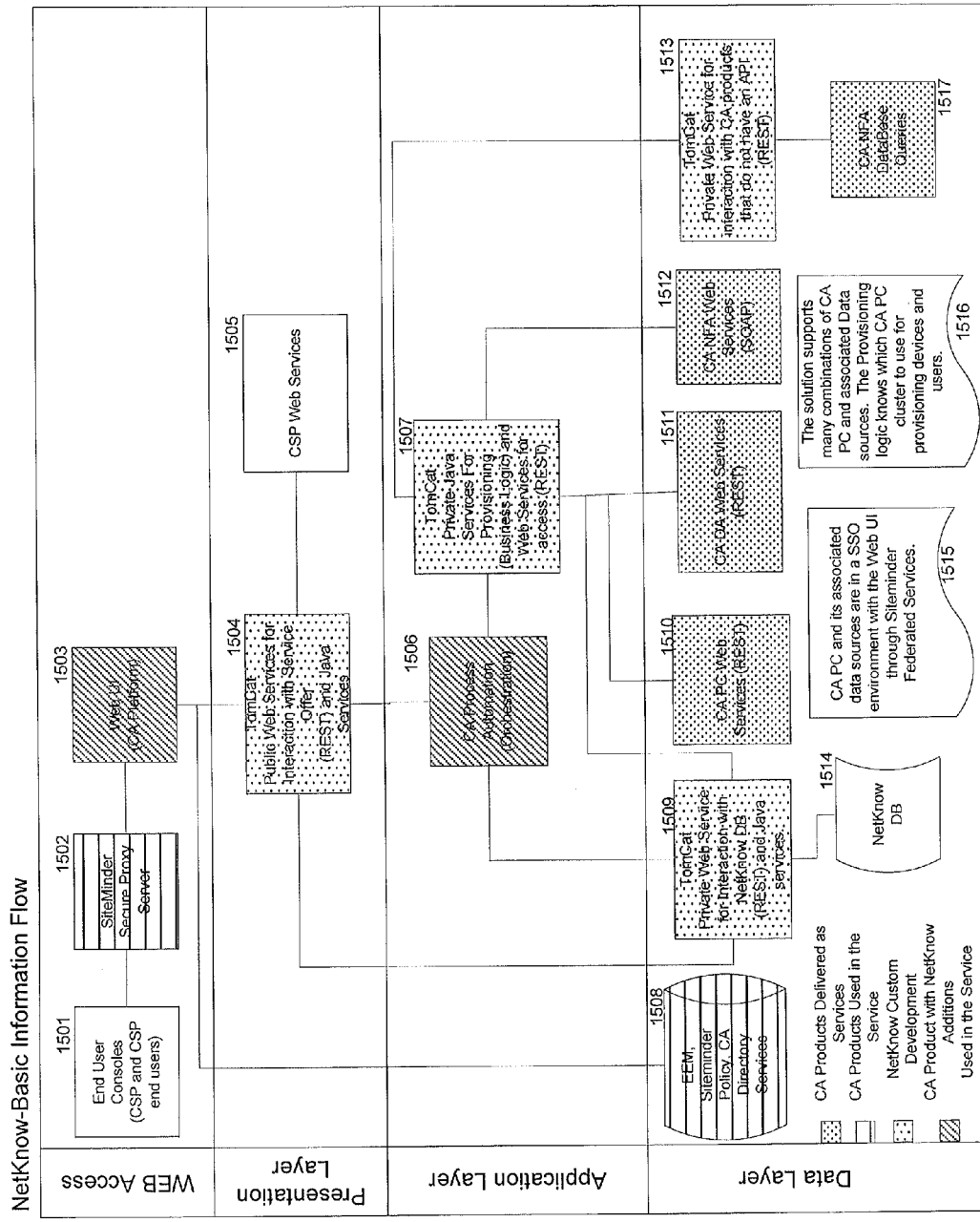
FIG. 15 is an example of the basic information flow to provide Netknow enterprise software access to multiple tenants by a system, method and/or computer program product according to various embodiments described herein.

FIG. 15 is an example of the basic information flow to provide access to Netknow enterprise software to multiple tenants according to some embodiments, which may correspond to operations performed by the multi-tenant wrapper 104 of FIG. 1. This figure provides a detailed example of the information flow for a multi-tenant solution for Netknow as implemented by Assignee CA Technologies (CA). Blocks 1501, 1502, and 1503 provide a Web Access solution in this example. Block 1501 illustrates end user consoles used by a Customer Service Provider (CSP) and/or CSP end users. Information input at Block 1501 may be provided to Block 1502 which, for example, may be a SiteMinder secure proxy server. Block 1503 is a Web UI that is a CA Platform used in the multi-tenancy product. Information may then flow to the presentation layer to Block 1504 and to the data layer to Block 1508. Block 1504 includes standard public server services such as TomCat, public web services for interaction with service offers (such as using the REST protocol) and Java services. These may invoke CSP Web Services at Block 1505. The server services of Block 1504 may then invoke a CA process automation (orchestration) at Block 1506. Custom development for NetKnow may be provided at Block 1507 such as TomCat private Java services for provisioning that includes custom business logic as well as web services for access (for example, REST APIs). Flow may then proceed to the data layer such as at Block 1508 where CA products may be used to provide multi-tenancy services. Examples may included an Embedded Event Manager (EEM), Siteminder, or CA directory services. The data layer may also include private server services such as the TomCat private web service for interaction with the NetKnow database 1514 through a REST API or private Java services. A CA performance center (PC) web service accessed with REST APIs may be delivered as a service, as in Block 1510. CA Data Access (DA) web services accessed with REST APIs may be provided, as in Block 1511. CA Network Flow Analysis (NFA) web services accessed with SOAP APIs may be provided at Block 1512. At Block 1513, Tomcat private web services for interaction with CA products that do not have an API such as REST is provided. These may interact with CA NFA database queries at Block 1517. As described at Block 1515, the CA PC and its associated data sources may be in a Single Sign-On (SSO) environment with a Web UI through Siteminder Federated Services. As described in Block 1516, the solution may support many combinations of CA PC and associated data sources. The provisioning logic may determine which CA PC cluster to user for provisioning devices and users.

Figure 16:
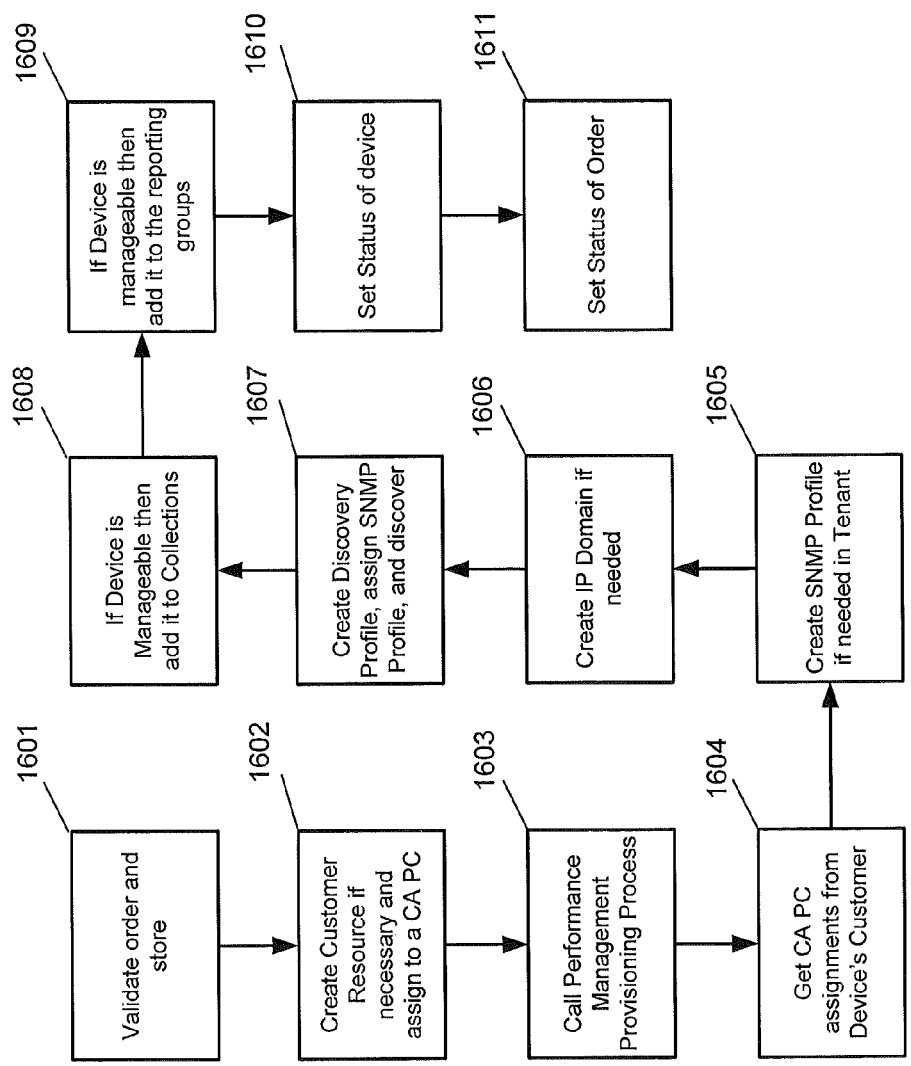
FIG. 16 is a flowchart of an example of activities performed by the multi-tenancy solution to provide enterprise software access to multiple tenants by a system, method and/or computer program product according to various embodiments described herein.

FIG. 16 is a flowchart of an example of activities done by the solution to provide enterprise software access to multiple tenants according to some embodiments, which may correspond to operations performed by the multi-tenant wrapper 104 of FIG. 1. This example relates to an SNMP-based performance management system for a device. At Block 1601, the order may be validated and stored. At Block 1602, a customer resource may be created, if necessary, and assigned to a CA Performance Center (PC). At Block 1603, a performance management provisioning process is invoked. The CA PC assignments may be obtained from the device's customer at Block 1604. Then, at Block 1605, an SNMP profile may be created, if needed by the tenant At Block 1606, an IP domain may be created as needed. At Block 1607 a discovery profile may be created and an SNMP profile may be assigned. The device may then be discovered. Then, at Block 1608, if the device is manageable, it is added to a collection. Moreover, at Block 1609, if the device is manageable, it may be added to one or more reporting groups. At Block 1610, the status of the device may be set. Then, at Block 1611, the status of the order may be set.

Additional discussion of various embodiments described herein will now be provided. It will be understood that these examples are non-limiting, and may be simplified compared to an actual multi-tenant system, in order to effectively illustrate their operation.

Various embodiments described herein can take enterprise level software and layer on top of it a product that will turn that enterprise software into a multi-tenant solution. In order to accomplish this goal, the enterprise level software must support the ability to separate data in a way that it can be delivered succinctly to specific users. The enterprise level software also needs to support multiple simultaneous users. This product will not add multi-user capability to an enterprise level software product. Instead, an enterprise level product is expanded into a multi-tenant product that may support more than one distinct customer within the same instance as other customers.

Typically, in order to support multiple customers with an enterprise level software product, a separate version of that enterprise software must be hosted for each customer. In contrast, various embodiments described herein can act as a multi-tenant engine for the enterprise level software product and allow for more than one customer/tenant to access one instance of the enterprise software product. Additionally, the individual capability of the enterprise product is not necessarily expanded. If a single individual customer has too much data and/or too many users for a stand-alone version of the enterprise product, then they will continue to have too much data and/or users as per various embodiments described herein. In other words, the capacity of a single instance of the enterprise software may not be expanded, but an ability to run many versions of the enterprise software product within a homogeneous environment will be provided so that it appears as one large installation of the enterprise software product. While various embodiments described herein may not be able to handle a customer who cannot fit in one normal instance of the enterprise software, an environment may be created that enables this customer to be broken down into smaller instances such that the collection of smaller instances would provide a homogenous environment for using the enterprise software product.

The following constructs of various embodiments described herein may be created to supply a multi-tenant solution for enterprise software will be discussed in greater detail. Even if the enterprise level software has a basic construct that matches these concepts, it may be limited to that particular instance of the enterprise level software. Coverage may be extended to cover a solution that binds together many enterprise level instances into one contained solution.

Once again referring to FIG. 10, the top level pieces of an example embodiment of multi-tenancy solution 1001 may be referred to as a domain 1002. A domain 1002 is a logical structure that contains the resources 1003 that will be consumed by the product. The solution 1001 will contain one or more domains 1002. A theoretical limit on the amount of domains 1002 the software can support is not imposed. Resources 1003 are the instances of the enterprise level software that are being serviced by the solution 1001, at a minimum. These resources 1003 may include physical and/or virtual hardware necessary to run the enterprise software, and/or the enterprise software itself. In some embodiments, domain features that improve the solution may be optionally added. An example feature added to the domain would include a Single Sign On (SSO) solution. A domain 1002 in this context is not necessarily an IP routing domain, but can contain one or more IP routing domains depending on the enterprise products being supported by the multi-tenancy solution.

A domain 1002 may include one or more customers 1004. A customer 1004 may define a distinct entity. This entity may belong to a single domain 1002 and may consume resources 1003 from one or more enterprise software instances in that domain 1002. A customer 1004 may include two types of entities: user entity 1005 and/or data entity 1006.

Data may be a key ingredient to the multi-tenancy solution. Data can take many forms and will be different depending on the enterprise software product being supported. Data may include files, data supplied by the customers/users themselves, information about entities that need to be contacted, and/or data gathered from those entities such that the data can then be displayed to the users. The data aspect of the multi-tenancy solution gives users a reason to log into the system. The data for each customer 1004 is formed into collections that are made available to users. These collections may include distinct file systems created explicitly for a particular customer 1004, a set of data stored in a database that is keyed to belong to a particular customer 1004, or a complex reporting group arrangement that the multi-tenancy solution created in the enterprise software explicitly for that customer 1004. The type of collection will depend on the enterprise software product. Examples will be discussed below that include SNMP data that has been collected from network hardware that has been provisioned into the system as one or more data entities 1006 by the customer 1004. The data collected and stored from these data entities 1006 by the enterprise software may be stored in collections that were made for this customer 1006 only.

User entities 1005 are another entity type that may exist in a customer 1004. User entities may have their own attributes that may be used to authenticate individual users and to serve as the basic information used to authorize access to any particular piece of data.

While each instance of the enterprise software supports access and control of users and data, a multi-tenancy solution is created according to various embodiments described herein to lay on top of this framework that allows data to be associated with a customer entity 1004. This concept generally may not be supported by enterprise level software. The customer entity 1004 may have access to multiple products if they are supported in this instance of the solution. Data available to the users may be segregated at the individual product level. Users may be allowed to access data they are authorized to access. This data authorization may span multiple customers and multiple enterprise software products or may span multiple users. In the case of a Managed Service Provider, administrators may need to access multiple customers. However, the administrators may not have permission to view all customers' data. Additionally the case of the third party administrator needs to be handled, where the third party administrator may need access to their customers, while the individual customers only have access to their individual data. In the case of multiple customer support, this need may span many instances of the enterprise software, but to the end user, it may be desired for the solution to appear as a black box. In other words, end users may not know that these separate instances exist. To each customer and/or user, data may be reported on in a similar manner and their access to this data is handled through a central process that hides the complexity of the solution.

Generally, the administrative functions of enterprise software are handled in a manner that does not allow for the segregation of data, so administrative functions may not be easily exposed to a customer's user entities. Lack of exposure to the administrative functions of the enterprise software breaks the multi-tenant model. In these cases, the multi-tenancy solution may create an abstraction of the administrative function or functions and acts as a third party to protect the segregation of data and maintain a multi-tenant environment. This segregation would allow the customer to control certain administrative aspects of the enterprise software that are important to delivering the data in a manner that adds value to the users.

Still referring to FIG. 10, the multi-tenancy solution 1001 sits at the top of relationship structure. There may be a one-to-many relationship of the solution 1001 to the domain 1002. Each domain 1002 may have one-to-many relationship to customers 1004. Each domain 1002 may have dedicated resources 1003 that will run the enterprise software. Each customer 1004 may have one or more data entities 1006. Each customer 1004 may have one or more user entities 1005 associated with that customer 1004. User entities 1005 potentially may belong to one or more customers 1004 in a domain 1002. Customers 1004 may be assigned to one or more resources 1003, depending on the enterprise software products associated with that customer 1004.

The multi-tenancy solution 1001 depends on this structure of data to enact the multi-tenancy aspect that it will deliver. The solution 1001 is created around three API layers: the display layer, the application layer and the data layer. The display layer is the input/output layer of the solution. Interaction is handled through this display layer. The display layer, the application layer and the data layer will each now be described in further detail.

The display layer is an input/output layer or a Business Support Systems (BSS) layer that allows outside agencies to interact with the solution. Requests for data and input of data into the solution may occur through this layer. The display layer may be, for example, a combination of RESTful APIs and Java Web Services that accept, validate and then start the processing or retrieval activities necessary to complete the request.

Referring once again to FIG. 14, the flow of data through the application layer starts with the display layer requesting an orchestration process based on the type of order being processed (add, modify, delete or a "get" request for information) and the resources effected by the request (provisioned devices, users, solution configuration, etc). The orchestration process acts as the controller ensuring that many aspects of the order are handled successfully. If an error occurs, these are identified such that the orchestration process acts as a link for a delivery team to troubleshoot a failed order. After resolution of the error, the process may be restarted to allow the order to proceed. The orchestration layer has some business logic that analyses the order and directs activities to the correct RESTful API's or Java Services necessary to complete the order.

The data layer may be comprised of a combination of RESTful APIs and SOAP APIs available through the enterprise software products. Additionally, RESTful APIs and Java Services may be created for the solution to abstract the data interaction for those enterprise software products that do not have sufficient APIs available to support the solution. Access to data is abstracted through these combinations of APIs to help drive consistency and the accuracy of the solution.

Reference is once again made to FIG. 11. The basic entry point into the system is a customer order 1101. Most entries into the display layer are on behalf of a customer. A customer will perform a create, read, update and/or delete operation on one or more data entities. A user entity will have the same functions available: create, read, update and/or delete. The user entity order may also contain customer information. There are informational APIs and APIs around the deployment of resources that are not entirely customer focused, but one focus of the multi-tenancy solution is on the concept of the customer.

The three tier classic model for data may be applied to the multi-tenancy solution. However, the display layer and the data layer may be API layers and not necessarily functional layers. Both layers may be viewed as fairly standard API layers. Various aspects of the multi-tenancy solution may be embodied in the application layer 1103 which has two major sections: the orchestration process and the Business Logic that is implemented with Java Services.

The application layer 1103 starts with the orchestration process. The orchestration process takes each order, breaks it down to its pieces and processes each piece through the business logic that is custom for each enterprise software product. While an order may contain many data entities or user entities, these will be processed one at a time through the business logic. Each data entity or user entity is treated as an individual component and may contain information unique to it.

Reference is now made once again to FIG. 12. According to some embodiments, the multi-tenancy solution may be creating a Tenant layer by defining a customer object. This is accomplished the first time an order is received for a customer who has never been encountered before, as in Block 1203. At this time, the customer object is created in the solution's data store 1109 (the solution may be database agnostic). The customer object may be assigned to a reporting resource in the domain associated with the customer, as in Block 1204. If the multi-tenancy solution only has one domain, then the default assignment is that single domain.

Enterprise software products that are associated with data will have methods of storing and collecting that data and to then report on the data stored or collected. The storage/collection resources 1003 are not necessarily always the same as the reporting resources. These resources 1003 may be dependent on the enterprise software itself. There is, however, an assumed relationship between these components that may have to exist for the enterprise software to function. A customer object is concerned with where that customer will see the data and where the reporting resources are located. A data entity 1006 is concerned with the resource 1003 that will collect and/or store the data. These can be the same resources that report on the data, but that depends on the enterprise software.

Users are associated with customers and enterprise software is associated with a given customer. It is not assumed by the multi-tenancy solution that by simply being assigned to a customer, that a user will have access to all enterprise software associated with that customer. Users may be controlled by a combination of authorization and/or authentication. Authorization will be tied into a system that will verify the identity of the user. For example, authorization could be a Single Sign On (SSO) environment that encompasses the solution or authorization may be accomplished by setting up passwords in different enterprise software instances authorized for that particular user. Authorization may define what the user can do in the solution. This would apply to the enterprise software reporting collections the user is given permission to access and also the roles and abilities the user will have when they access the enterprise software direction. Authorization will also play a role in which users can utilize which portions of the abstracted administrative tools that will be made available to users of the multi-tenancy solution.

Additional discussion of various embodiments described herein will now be provided in connection with FIGS. 10-16, in which specific examples are provided. It will be understood that these examples are non-limiting, and may be simplified compared to an actual multi-tenant system, in order to effectively illustrate their operation.

A detailed example of a multi-tenancy solution will now be discussed. For this example, there will be a customer "Generic Telco Company" (CGT) who is using the enterprise software product to fully utilize their investment in enterprise software. CGT is now either a Managed Service Provider (MSP) or a Communication Service Provider (CSP) with a MSP service. This product will be of value to the MSP marketplace where the MSP is managing a collection of resources for a customer, such as servers, switches, routers, firewalls, load balancers, and other infrastructure equipment. This management of resources, in this example, is the main role of the MSP. However, the MSP, either as a value add or as a source of additional income, will want to supply network reporting to their customers. At this point in time, this is not practical with the enterprise level software generally available for this purpose.

CA provides products according to various embodiments described herein. These products will be referred to as multi-tenancy products. Enterprise products can cost hundreds of thousands of dollars and only the largest customers of the MSP will be given this value add and/or optional uplift. The multi-tenancy products will allow the MSP to offer these services associated with Enterprise products to many of their customers, by taking the enterprise software and turning it into a multi-tenant supported product. So instead of having a one to one relationship between enterprise software product and customer, the multi-tenancy solution will enable a one-to-many relationship. For example, the enterprise level product in question may be a CA Technologies product such as CA Performance Management (CA PM), which is a network performance monitoring product. This product allows for the creation of collections, creation of call groups that can then be assigned to specific users, and supports multiple user access, thereby meeting pre-requisite needs in a enterprise level product. According to some embodiments described herein, CA may provide a multi-tenancy product to an MSP that will provide a wrapper around an enterprise product such as CA PM so that it may be offered to many customers.

Continuing with the ongoing example, CGT will access the product through the display layer RESTful APIs and will place create, read, update and delete orders through this API. As part of the installation the product pieces will be installed along with all the CA Performance Management instances to meet the needs of the customer base. In this example case, all of the demands may be handled with one domain and one installation of the CA Performance Management instance. Once the product is installed, the basic configurations are defined in the product data store, including information about the domain and the enterprise software contained in the domain. The multi-tenancy product may need this information to know how to reach the resources during its provisioning process.

FIG. 13 is now referenced once again. In the current design of the product, all orders are assumed to be a customer order. The main goal of the product is to layer a multi-tenant, customer aware interface on top of enterprise level software, so orders are assumed as belonging to the customer, at Block 1301. In the flow discussed in the example above, the order was for a data entity. In the case of Performance Management, this will be referred to as a device. A device may be a router, a switch, a server, or a specialized version of one of these types. A device may be a distinct entity that has its own distinct data that will be collected and reported on. A device may be virtual, such as for example, a VMware instance. The device requirement is that it be a distinct entity that contains its own data, not that the device be real or virtual. In the flow in FIG. 13, the data layer is not displayed. The application layer and the display layer both interact with the solution storage and enterprise software through the data layer. So the data layer may be an abstraction layer created to centralize the access to the various resources that will eventually store and report on data. The access to the data layer in implied in various flow chart actions in FIG. 13.

The customer order accesses the display layer through a RESTful API and this layer validates that required fields are populated. In some cases, the raw order is stored in the solution data store, as in Block 1302. At Block 1303, if the order is invalid, then execution may end here. However, if the order is valid then the application layer is triggered and the orchestration process adds the order to its queue, at Block 1304. The orchestration process will pull the order from the queue, at Block 1305. Then, at Block 1306, a check to see if a customer object exists in the solution data store is performed, that matches the customer credentials that are included in the customer order. If a customer object does not exist then it is created before any further processing takes place, at Block 1307. The customer object is assigned to a reporting engine for the products being ordered. In this case the device is ordering performance management reporting so the customer is assigned to the CA Performance Center resource that is accepting new customers in a domain, at Block 1308. The CA Performance Center is a part of the performance management that reports on data. The concept of a customer is of importance to the solution. As such, until the customer object is created, processing may not progress. Then, at Block 1310, once the customer object is identified and/or created then each device in the order is stored in the Solution database and the device is associated with its customer. There is now a relationship between the device and the customer. Then, at Block 1309, the device may be associated with the performance management resource that will collect data. The performance management resource also may be associated with the CA Performance Center that was assigned to the customer.

Now that the device and customer information are in the solution database and that entity is up-to-date, processes may be started that add the device to the enterprise software product and start collecting data that will later be reported on as user entities are assigned to the customer. A first step in performance management is to create a discovery profile and then execute the discovery so that performance management may identify the one or more devices, as in Block 1311. Performance management may verify that it can connect to the one or more devices and extract information. At the end of discovery, the performance management product may have identified a status for each of the devices just discovered as being: manageable, unreachable or pingable, as in Block 1312. The multi-tenancy solution may update its database with this status information for each device. In some embodiments, manageable devices may be of greater interest since they are the only devices from which data can be collected and reported on. Pingable and unreachable devices may need to be serviced by, for example, supplying the solution with the correct connection information and/or updating security aspects of the network to allow the solution to have access to the devices.

Still referencing FIG. 13, at Block 1314, manageable devices may need to be configured to collect data requested in the customer order. To do this, performance management may assign these devices to collections that were pre-created and associated with monitoring profiles. The monitoring profiles may define exactly what data the performance management software will attempt to collect from the device. Once the device is assigned to a method of collecting data, then it is assigned to a reporting group that the solution creates explicitly for this particular customer, at Block 1316. This could include one or more groups, but these groups may be controlled by the multi-tenancy solution and may contain devices and device information that belongs to a specific customer. By automating this process, a layer of customer awareness is on top of the enterprise software. When a user is assigned to this customer and is given permission to use the performance management product, the multi-tenancy solution may assign the groups created in the earlier step to that user. This will allow the user to report on the data being collected for this particular customer.

In the above processes the underlying enterprise software is unaware of the multi-customer logic that is being applied to its structures. For the performance management product, one group is the same as another at the same level of hierarchy. As this order system processes a set of orders for a second customer 2, the end result is a new set of reporting groups that are explicitly associated with customer 2. However, these groups are explicitly associated with that customer in the multi-tenancy product that sits on top of the enterprise software. Performance management may have no knowledge of this relationship and does not need this knowledge to operate. The solution create keeps track of all of these relationships. In this foregoing example, customer 2 could be assigned to a different instance of performance management in the same domain. The multi-tenancy product not only adds a multi-tenancy feature to enterprise software, but it groups all of the enterprise software into a resource bucket and then knows how to use the available resources to most fully utilize them. A user assigned to customer 1, customer 2, and customer 3 would just see an instance of the enterprise software when they access reports for any of these three customers. These three customers, however could be on different instances of the enterprise software and unless the user examines the URL closely, they may be unaware that these customers are on the same or different enterprise software instances.

Embodiments of the present disclosure were described herein with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A software accessing method, comprising:
(a) constructing a wrapper accessible by a Managed Service Provider (MSP) around an enterprise software that is configured to be accessible by only a single tenant, wherein the wrapper around the enterprise software encapsulates the enterprise software and provides interfaces to access data and/or functionality of the enterprise software;
(b) receiving, by the MSP, a request for a first tenant comprising a plurality of users, to use the enterprise software that is accessible by only the single tenant;
(c) determining, based on the request for the tenant, that a data entity is associated with the tenant;
(d) determining data resources required by the data entity that is associated with the tenant;
(e) determining, by the MSP, if the enterprise software has capacity to support the data resources required by the tenant;
(f) providing access to the enterprise software to the tenant in response to determining that the enterprise software has the capacity to support the data resources required by the tenant;
(g) provisioning data resources related to the enterprise software to be associated with the data entity using the interfaces in the wrapper;
(h) storing information related to the data entity;
(i) authorizing one or more users associated with the tenant to access the data resources;
(j) segregating data associated with an administrative function of the enterprise software for the tenant from data associated with the administrative function of other tenants;
(k) identifying an administrative user authorized to access the administrative function of the enterprise software;
(l) providing access to the administrative user to the administrative function of the enterprise software based on the data was segregated; and
(m) repeating (b) through (l) above for a second tenant, different from the first tenant, so that the second tenant also uses the enterprise software that is accessible by only the single tenant.

2. The method of claim 1, further comprising:
adding the data entity to a collection that allows the data resources to be accessed by the one or more users associated with the tenant.

3. The method of claim 1, wherein determining if the enterprise software has capacity to support the tenant comprises:
determining, based on the request for the tenant, a number of prospective users associated with the tenant;
determining a number of provisioned users configured to access the enterprise software; and
determining if the enterprise software has capacity to support the number of prospective users associated with the tenant in addition to the number of provisioned users configured to access the enterprise software that was determined.

4. The method of claim 3, wherein providing access to the enterprise software to the tenant in response to determining that the enterprise software has capacity to support the tenant comprises:
assigning resources related to the enterprise software to the tenant;
storing information related to the tenant; and
performing user authorization for one or more users associated with the tenant.

5. The method of claim 1, further comprising:
accessing the enterprise software by the one or more users associated with the tenant.

6. A computer program product comprising:
a non-transitory computer readable storage medium comprising computer readable program code embodied in the medium that when executed by at least one processor of a computer system causes the computer system to perform operations comprising:
(a) constructing a wrapper accessible by a Managed Service Provider (MSP) around an enterprise software that is configured to be accessible by only a single tenant, wherein the wrapper around the enterprise software encapsulates the enterprise software and provides interfaces to access data and/or functionality of the enterprise software;
(b) receiving, by the MSP, a request for a first tenant comprising a plurality of users, to use the enterprise software that is accessible by only the single tenant;
(c) determining, based on the request for the tenant, that a data entity is associated with the tenant;
(d) determining data resources required by the data entity that is associated with the tenant;
(e) determining, by the MSP, if the enterprise software has capacity to support the data resources required by the tenant;
(f) providing access to the enterprise software to the tenant in response to determining that the enterprise software has the capacity to support the data resources required by the tenant;
(g) provisioning data resources related to the enterprise software to be associated with the data entity using the interfaces in the wrapper;
(h) storing information related to the data entity;
(i) authorizing one or more users associated with the tenant to access the data resources;
(j) segregating data associated with an administrative function of the enterprise software for the tenant from data associated with the administrative function of other tenants;
(k) identifying an administrative user authorized to access the administrative function of the enterprise software;
(l) providing access to the administrative user to the administrative function of the enterprise software based on the data was segregated; and
(m) repeating (b) through (l) above for a second tenant, different from the first tenant, so that the second tenant also uses the enterprise software that is accessible by only the single tenant.

7. The computer program product according to claim 6, wherein determining if the enterprise software has capacity to support the tenant comprises:
determining, based on the request for the tenant, a number of prospective users associated with the tenant;
determining a number of provisioned users configured to access the enterprise software; and
determining if the enterprise software has capacity to support the number of prospective users associated with the tenant in addition to the number of provisioned users configured to access the enterprise software that was determined.

8. A computer system comprising:
a hardware processor;
a memory coupled to the hardware processor and comprising computer readable program code; and
a multi-tenancy system embodied in the computer readable program code, that runs on the hardware processor, the multi-tenancy system configured to perform operations comprising:
(a) constructing a wrapper accessible by a Managed Service Provider (MSP) around an enterprise software that is configured to be accessible by only a single tenant, wherein the wrapper around the enterprise software encapsulates the enterprise software and provides interfaces to access data and/or functionality of the enterprise software;
(b) receiving, by the MSP, a request for a first tenant comprising a plurality of users, to use the enterprise software that is accessible by only the single tenant;
(c) determining, based on the request for the tenant, that a data entity is associated with the tenant;
(d) determining data resources required by the data entity that is associated with the tenant;
(e) determining, by the MSP, if the enterprise software has capacity to support the data resources required by the tenant;
(f) providing access to the enterprise software to the tenant in response to determining that the enterprise software has the capacity to support the data resources required by the tenant;
(g) provisioning data resources related to the enterprise software to be associated with the data entity using the interfaces in the wrapper;
(h) storing information related to the data entity;
(i) authorizing one or more users associated with the tenant to access the data resources;
(j) segregating data associated with an administrative function of the enterprise software for the tenant from data associated with the administrative function of other tenants;
(k) identifying an administrative user authorized to access the administrative function of the enterprise software;
(l) providing access to the administrative user to the administrative function of the enterprise software based on the data was segregated; and
(m) repeating (b) through (l) above for a second tenant, different from the first tenant, so that the second tenant also uses the enterprise software that is accessible by only the single tenant.

9. The computer system according to claim 8, wherein determining if the enterprise software has capacity to support the tenant comprises:
- determining, based on the request for the tenant, a number of prospective users associated with the tenant;
- determining a number of provisioned users configured to access the enterprise software; and
- determining if the enterprise software has capacity to support the number of prospective users associated with the tenant in addition to the number of provisioned users configured to access the enterprise software that was determined.

* * * * *